United States Patent [19]

Margolin et al.

[11] Patent Number: 4,684,205
[45] Date of Patent: Aug. 4, 1987

[54] FIBER OPTIC CONNECTOR WITH COMPENSATING MECHANISM

[75] Inventors: Mark Margolin, Lincolnwood; James E. Moore, Wheaton; Igor Grois, Lincolnwood, all of Ill.

[73] Assignee: Allied Corporation, Morris Township, Morris County, N.J.

[21] Appl. No.: 757,097

[22] Filed: Jul. 19, 1985

[51] Int. Cl.[4] .............................. G02B 6/38
[52] U.S. Cl. .............................. 350/96.21; 350/96.20
[58] Field of Search ............... 350/96.21, 96.20, 96.22

[56] References Cited

U.S. PATENT DOCUMENTS

| 4,084,742 | 1/1980 | Corrales ............ | 350/96.21 X |
| 4,336,977 | 6/1982 | Monaghan et al. ........... | 350/96.20 |
| 4,447,121 | 5/1984 | Cooper et al. .............. | 350/96.21 X |

FOREIGN PATENT DOCUMENTS

| 0050203 | 4/1980 | Japan .................... | 350/96.21 |
| 0017912 | 1/1982 | Japan .................... | 350/96.2 |

OTHER PUBLICATIONS

"An Optical Connector", Optopia, 1983.
L. Balliet and T. J. Wylie, "Static Elimination in Fiber Optic Connectors", IBM Tech. Disclosure Bulletin, vol. 24, No. 3, 8/81-pp. 1622-1623.
Norio Kurochi et al., "A Development Study on Design and Fabrication of an Optical Fiber Connector", 3rd Euro. Conf. on Optical Communication (9-77), pp. 97-99.
Suzuki et al., "A New Demountable Connector Developed for a Trial Optical Transmission System", E.C.L. Tech. Jour., vol. 27, No. 2 (1978), pp. 339-358.

*Primary Examiner*—John Lee
*Attorney, Agent, or Firm*—A. Jose Cortina; Roger H. Criss

[57] ABSTRACT

A fiber optic connector includes a connector assembly for connecting a fiber optic cable thereto. The connector assembly includes an arrangement whereby the cable can be crimped and attached to the connector without crimping force being exerted on the buffer layer of the cable. The connecting end of the connector has the capillary ferrule extending outwardly therefrom in a spring loaded manner. In connection with another connector the respective ferrules are held in a centering sleeve and retract against the compressive force of a spring into each connector thereof to ensure alignment and tight connection between the core elements held by the ferrules. In order to permit repeat connections, the ferrules are held non-rotatably within the connectors. Further compensating means is provided for ensuring that the fiber core of the cable is maintained flush with the end of the capillary ferrule at all times and under varying temperature conditions.

17 Claims, 11 Drawing Figures

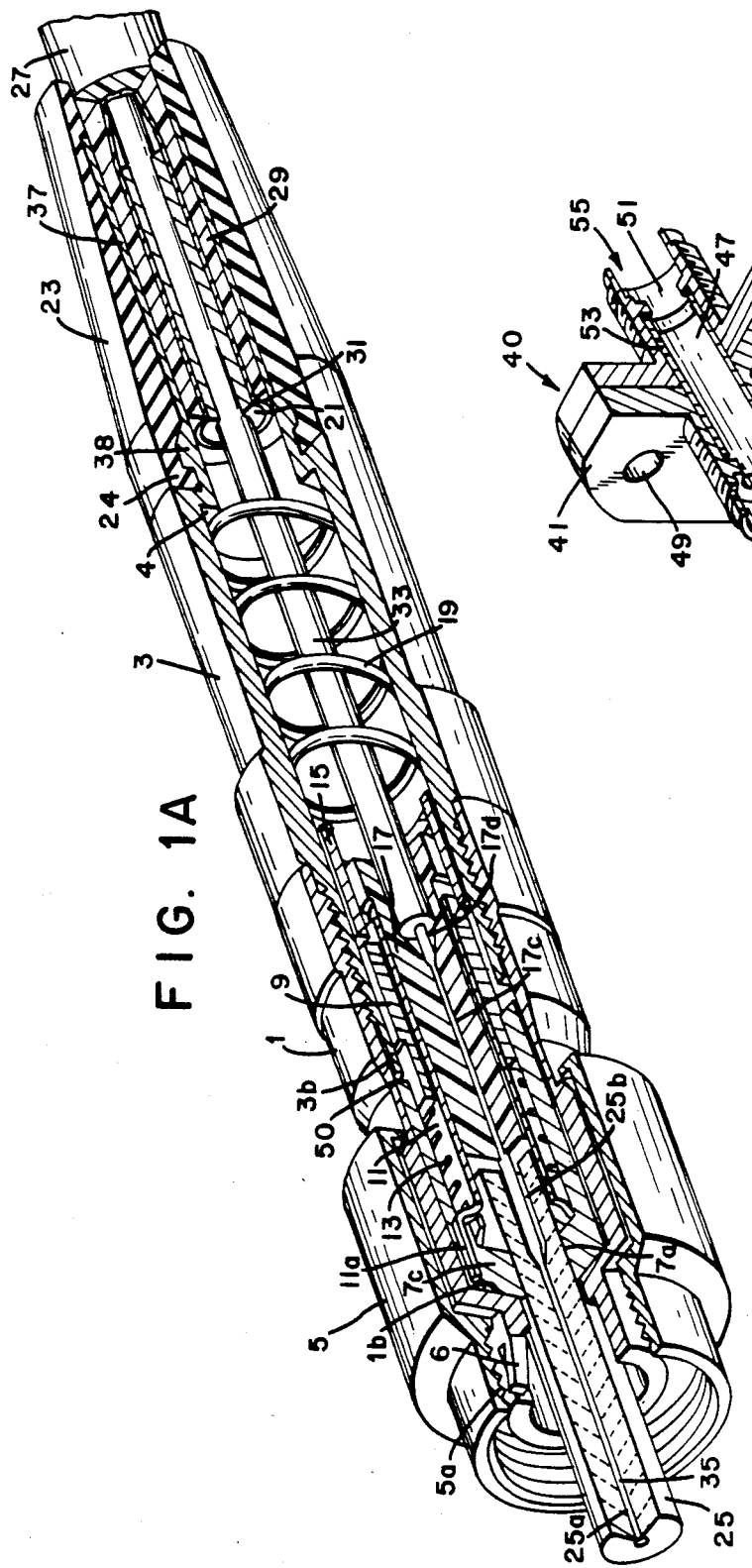
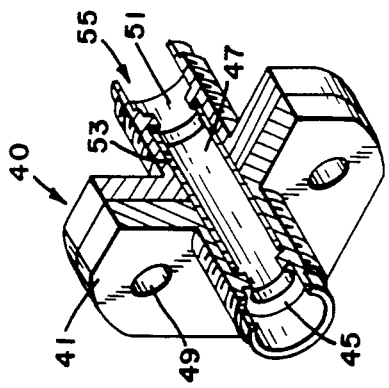
FIG. 1A
FIG. 1B

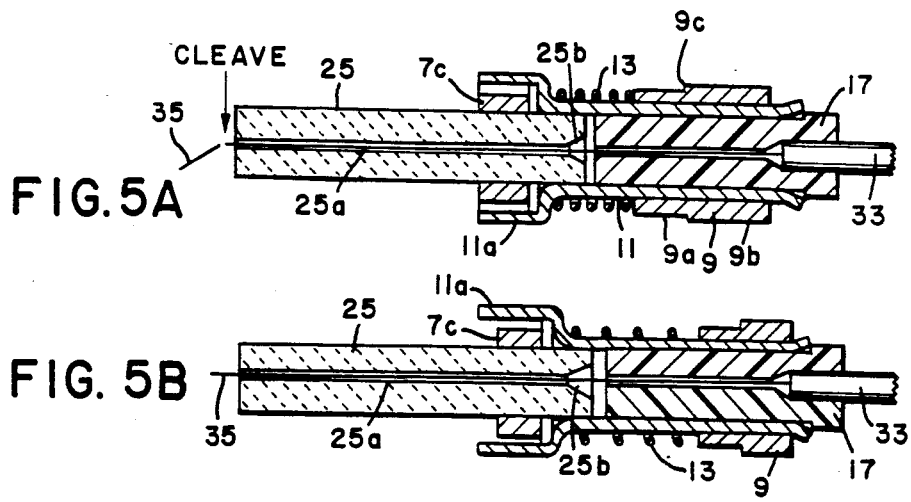
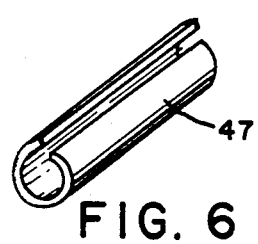
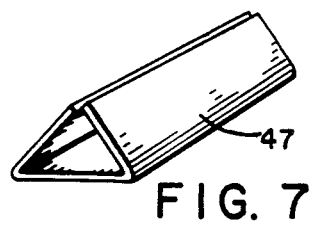
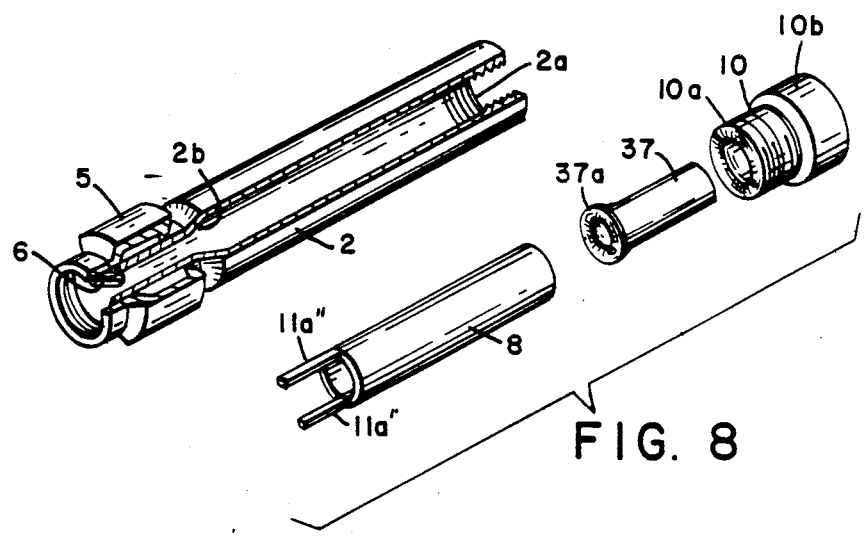

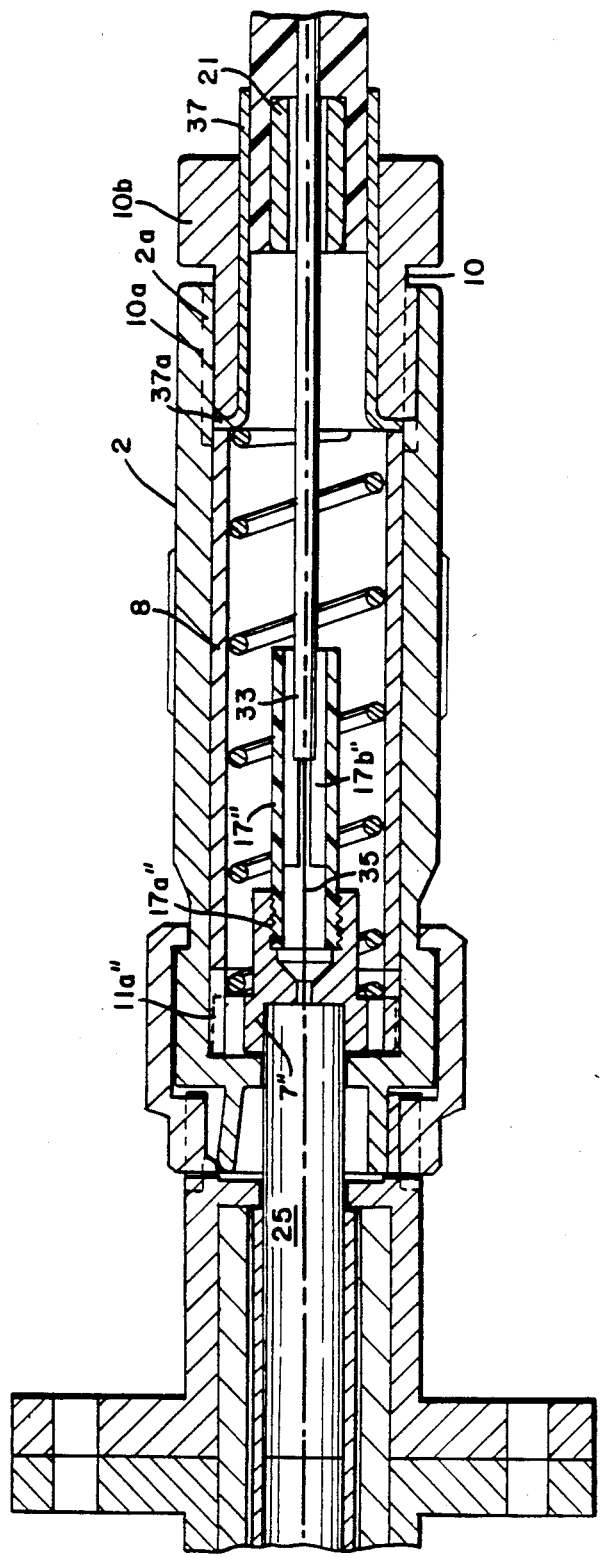

FIBER OPTIC CONNECTOR WITH COMPENSATING MECHANISM

BACKGROUND OF THE INVENTION

This invention relates to an optical fiber mechanism and connector assembly employing same for performing connection with precise positioning of fiber optic cables and the core optical fiber thereof. More specifically, this invention relates to such a connector for use with both single and multimode fibers, but the preferred embodiment finds special use with single mode fiber optic cables.

The use of optical fibers as a means for transmitting optical signals in the field of optical communications has been known for many years. When employed in such systems, it is necessary to interconnect different core fibers within the system to complete the communications link. However, in such connections it is often found that not only are there transmission losses when the light is transmitted through the optical fibers, but extensive transmission losses also result from the actual fiber interconnections themselves.

In order to eliminate or minimize such interconnection losses, fiber alignment must be achieved with accuracy on the order of microns, and at the same time the fibers have to closely abut in a manner such as to not damage the cleaved or cut fiber ends. More particularly, in the piror art in connecting the fiber ends, a grinding or rotating movement often occurs and the ends of the fibers become damaged or scarred thereby, resulting in additional transmission losses. Moreover, although the fiber ends will initially be in abutment upon initial connection, due to temperature changes, the fibers expand or contract ultimately resulting in a gap between fiber ends and consequently, additional interference losses.

One prior art approach to centering the fibers or waveguides within aligned connections is disclosed in U.S. Pat. No. 4,440,469 to Shoemaker. The device of Shoemaker is an SMA-style optical waveguide connector, the type to which this invention is directed, and includes a tubular contact body having an axial passageway profiled for receiving a primary ferrule therein. The passageway is further profiled for retaining the primary ferrule at a rearward location, which ferrule receives an optical waveguide therethrough with a forward end segment of the waveguide extending forward from a forward end of the contact body. An alignment ferrule is provided and is mounted over the forward end of the contact body and received on a forward segment of the optical waveguide. The forward end of the primary ferrule and the inner profile of the contact body passageway are structured to interfit and define a region wherein adhesive material is inserted from the forward terminal end of the connector assembly. The adhesive is retained within this region by the alignment ferrule which fits over the forward segment of the optical waveguide.

Although initially aligning the fiber very precisely, as the adhesive sets, some shrinkage of the adhesive occurs in the device of Shoemaker, and it is not possible to achieve fine fiber alignment readily and reliably with such an arrangement. Moreover, the use of the adhesive complicates the assembly operation and requires long setting times and often, due to the setting of the adhesive, as noted above, even if misalignment does not occur, changes in temperature will cause shrinkage or expansion of the adhesive ultimately resulting in creation of a gap and in the fiber ends being moved out of abutment with each other.

An alternative approach to solving these problems is disclosed in U.S. Pat. No. 4,487,474 which teaches the use of a pair of ceramic optical plugs having optical fibers extending coaxially therethrough which fit within a ceramic sleeve. A coupling nut is used to hold the two plugs together to effect the interconnection between the optical fibers.

Although generally providing improved results over the adhesive employing prior art systems, the connector employing the ceramic plug as disclosed in this patent includes disadvantages in that it is difficult to ensure that the two ceramic plugs are tightly held against each other, and further, there is the possibility of rotation of the plugs and fibers with respect to each other will result in scarring of the fiber faces upon repeated connection and disassembly of the connector device. As previously noted, such scarring can cause significant transmission losses at the interface. Further, as noted previously, although it is possible to maintain the plugs in abutment, it is often the case that the fibers will shrink into the plug due to temperature changes, which results in an interference causing gap between the fiber ends.

In another known prior art device the plugs are used with adhesive to ensure that the fiber ends remain flush with the plugs. However, this type of system requires polishing and buffing of the ends of the fibers. This buffing will often result in the end faces becoming concave in the direction of its respective holding plug. Thus, in assembling the two plugs against each other a gap will result between the concave end surfaces will all the attendant disadvantages discussed above.

The above-discussed gaps between fiber ends while causing interference are not as disruptive in the case when multimode fiber optic cables are used. However, in the case of single mode fiber optic cables, the resultant gap can cause unacceptable transmission losses. In the prior art there are only several ways to reduce these losses in the case of single mode fiber optic cables.

One solution provided is to epoxy the fibers in place, but this includes all the disadvantages discussed above. A second approach is to use an arrangement of several ferrules concentrically assembled in what is known as a "stratus" configuration. However, this arrangement is still prone to gap creation and is generally not satisfactory. Moreover, this arrangement is also very complicated to assemble. A third arrangement, which is more satisfactory in terms of results, is a technique of molding the fiber into a molded connector.

Such molded connectors or methods of molding connectors are disclosed in U.S. Pat. Nos. 4,107,242; 4,213,932; 4,264,128; and 4,512,630. Although providing improved results, these devices are complicated to assemble requiring complicated molding devices. As a result expenses are increased. Moreover, the devices are not field terminable.

As can be seen, the prior art systems suffer from a number of disadvantages at the fiber connection ends. Moreover, the connectors themselves do not provide a simple and secure method of attaching the fiber optic cables to the connector assembly itself. Generally, some type of simple crimping arrangement is employed resulting in a danger of the internal waveguide or core fiber of the fiber optic cable being deformed or damaged as a result of the crimping operation. Moreover, simple crimping is often not satisfactory in terms of holding efficiency.

SUMMARY OF THE INVENTION

In order to overcome the above-discussed disadvantages discussed with reference to the prior art, the inventio provides an epoxiless and polishless fiber optic cable connector of simple construction which can be rapidly and easily assembled and disassembled in the field. Further, the invention provides a fiber optic cable connector having in a preferred embodiment a temperature compensating mechanism to ensure that the fiber ends of respective connectors are always in physical contact. In a still further aspect the invention provides an improved mechanism for connecting a cable to a connector.

As noted above, in one aspect the invention resides in a fiber optic connector made up of body having means for connecting a fiber optic cable to one end thereof, with the buffered fiber and bare optical fiber of the cable extending into the body of the connector. Fiber retention means is provided for holding a portion of the buffered fiber at a terminated portion thereof with the bare fiber extending from the buffer layer, in fixedly secured relationship with respect to the fiber retention means, and through the body. A capillary ferrule slidably receives the portion of the bare fiber therein and is held by a capillary retainer in fixed relationship with respect thereto, and in a manner extending from the other end of the body such that the capillary retainer mechanism is retained within the body. A main spring serves to urge the capillary retainer toward the other end of the body for permitting the capillary ferrule to retract into the body when the connector is connected to a like connector.

In addition, in single mode applications it is preferred that a mechanism cooperates with the above to permit termination of the core fiber in a manner such that it is always maintained flush with the end capillary ferrule. Thus, when employed to connect to another fiber end, the mechanism functions to effect relative position compensation with respect to the elements of the connector so that the two fiber ends will be in physical contact under all conditions. In a more specific aspect the connector includes a key mechanism for preventing rotation of the fiber core relative to the connector body and for ensuring a keyed position interconnect with a like connector. The connector further comprises, in combination, an adaptor body having centering means for centering respective capillary ferrules of like connectors and for connecting two connector bodies to each other.

The compensating mechanism discussed above includes, preferably, a two-part fiber clamp for clamping the bare fiber. The two parts are held together by a clamp body. The clamp body is spring loaded in a manner such as to permit relative movement between the bare fiber and the capillary ferrule for temperature compensation and to ensure abutment between fiber ends even under misalignment conditions, and with a sufficiently low force to prevent breakage of the ends of the fibers and to not disturb transmission between the fiber ends.

In still another aspect the invention relates to the means for connecting the fiber optic cable to the one end of the body. The means for connecting the cable comprises a crimpable structure at the end of the body which fits over the outer jacket of the cable. An inner sleeve is received coextensively with the crimpable structure around the buffer layer holding the jacket and strength member layer between the inner sleeve and the crimpable structure. The crimpable structure is crimped to hold the jacket and strength layer between it and the inner sleeve. To provide more secure holding, the inner sleeve can also be crimped onto the buffered fiber prior to crimping of the crimpable structure. Although described with reference to a fiber optic cable, this mechanism will also function effectively on any type of multilayer cable capable of permitting insertion thereinto of such an inner sleeve as described.

In addition, the device of the invention provides a free floating structure which permits a limited amount of movement of the cable fiber in a direction transverse to the longitudinal axis of the connector. This allows compensation between misaligned fiber ends of different connectors so that precise alignment between the fiber ends of different connectors can be repeatedly and reliably obtained. Further, to enhance such performance, the connector also permits movement of the fiber ends along the longitudinal axis thereof ensure abutment between fiber ends under all conditions.

Accordingly, it can be seen that the device of the invention provides one advantage in that it facilitates secure connection of a fiber optic cable to a connector without the risk of deformation or damage to the optical fiber or waveguide of the fiber optic cable. In addition, the connector provides for secure and tight connectio between two opposed waveguides in a manner such that little or no damage, due to the low forces exerted on the fiber ends, is done to the end of the waveguides due to repeated connections being effected. Moreover, the connectio between the waveguides is done in a manner that results in very low transmission losses between the respective two fibers or waveguides of the cables. Further, the fiber and cable are only held mechanically. No epoxy or chemicals are employed. Moreover, it is possible to cleave the fiber after the connector has been almost completely assembled, or even fully assembled. Thus, the probability of erroneous positioing of the fiber ends with respect to the ferrule, breakage of the fiber ends or dirt accumulation prior to or during assembly.

Other features and attendant advantages of the invention will be more readily apparent as the same becomes better understood from the following detailed discussion made with reference to the accompanying drawings in which like reference numerals designate like parts throughout the drawings.

BRIEF DESCRIPTION OF THE DRAWINGS

FIG. 1A is a perspective view, in particular cross-section, of a connector assembly in accordance with a preferred embodiment invention shown in assembled condition;

FIG. 1B is a perspective view, in partial cross-section of an adaptor for use with the connector of the invention;

FIGS. 5a and 5b are side views, in cross-section of the operation of the clamp body, capillary retainer and clamp body spring mechanism of the invention to ensure termination of the fiber flush with the end of the ferrule at all times after the connector is assembled;

FIGS. 6 and 7 are perspective views of alternative constructions of centering sleeves which can be employed in the adaptor of the connection of the invention;

FIG. 8 is an exploded view, in partial cross-section of portions of the connector of the invention showing an alternate embodiment of the clamping mechanism for the fiber optic cable; and FIG. 9 shows in cross-section an alternative embodiment of the connector of the invention especially adapted for use with multimode fiber optic cables.

DETAILED DISCUSSION OF THE INVENTION

Figure 2:
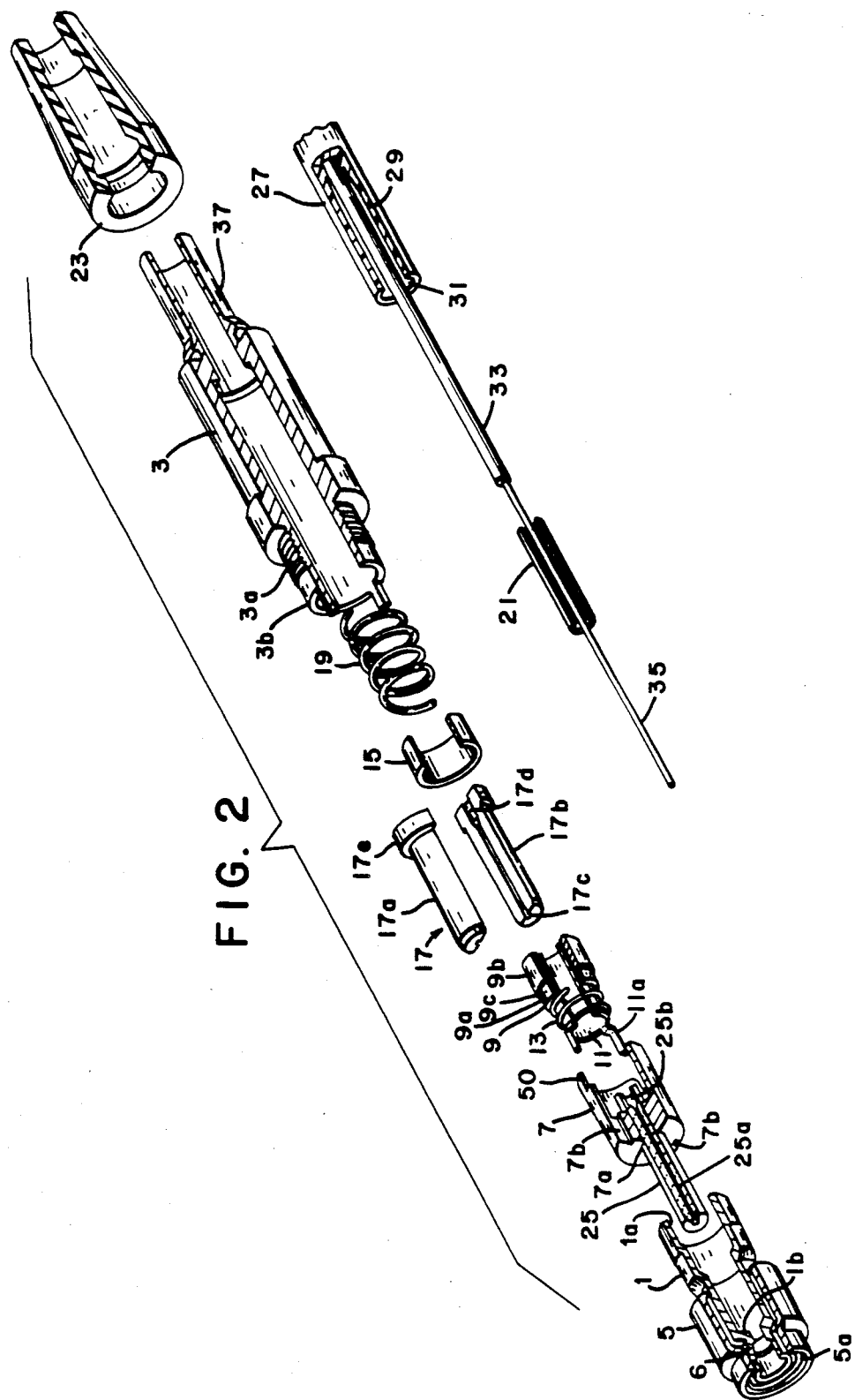
FIG. 2 is an exploded view, in partial cross-section of the connector assembly of FIG. 1A.

This invention provides an apparatus for rapidly connecting the ends of two opposed fiber optic waveguides or bare fibers of fiber optic cables, and especially in a preferred embodiment for the connection of respective fibers of fiber optic cables of the single mode type. The invention also has use in the preferred as well as in an alternative embodiment, in connecting fiber optic cables of the multimode type. More particularly, the invention involves a connector assembly which is capable of connecting a fiber optic cable effectively and securely to one end of a fiber optic connector and of supporting and holding both a portion of buffered fiber and the bare fiber of the fiber optic cable, without use of epoxy or other adhesive, through the body of the connector for connection in direct physical contact at all times, not withstanding temperature effects, with an opposing bare fiber end held by a like connector.

The connector assembly in accordance with a preferred embodiment of the invention is generally shown in FIGS. 1A, 1B, 2 and 3 and unless otherwise noted will be described generally with reference to said Figures.

As shown in FIGS. 1A, 1B, 2 and 3, in a preferred embodiment the connector assembly includes a rear body 3 within which is housed the majority of the components of the assembly. The body 3 includes at one end thereof a crimpable extension 37 extending therefrom for having cable 27 slid thereinto. The cable 27 is preferably a single mode fiber optic cable of the type having an outer jacket 29, an intermediate layer of strength fibers 31, typically Kevlar ® type fibers commercially available from Dupont Corporation, a buffered fiber layer 33 and an inner bare fiber 35. However, the invention can also be employed with cables of the type having multiple fibers surrounded by the buffer layer 33.

To connect the cable 27 to the rear body 3, the jacket 29 and strength layer 31 of the cable is terminated at a predetermined point with respect to the buffer 33 and bare fiber 35, with the buffer 33 and bare fiber 35 each extending a predetermined distance from the discussed termination point. An inner sleeve 21 is slid over the fiber 35 and buffer 33 so as to be received within the strength layer 31 and generally substantially coextensive with the crimpable extension 37. To hold the cable 27 to the rear body 3, the extension 37 is crimped onto the cable 27 to hold the jacket 29 and strength layer 31 between it and the inner sleeve 21.

In one embodiment the inner sleeve 21 is made of metal and is generally non-deformable relative to the extension 37. This serves to protect buffer 33 and fiber 35, and to provide a rigid base onto which to crimp. Alternatively, to provide more secure attachment the inner sleeve 21 can also be deformable and crimped onto the buffer 33 prior to crimping of the extension 37. In this latter case, the sleeve 21 will be slightly longer, as shown in dashed lines 21a in FIG. 3, and projects out from the strength layer 31 to provide a crimping surface.

A boot 23 having engaging means 24 can be used to cover the connection, as shown, and engages with corresponding engaging means 38 of the extension 37. The boot 23 can be typically made of rubber and provides a strain relief function.

Once connected to the rear body 3 a portion of buffered fiber 33 and a portion of bare fiber 35 extend through the rear body 3 toward the other end thereof. Inside the rear body 3 is received a main spring 19 which abuts at one end against abutments 4 on the interior of the rear body 3. Also received within the rear body 3 is a spacer ring 8 which serves as an abutment on one side thereof for the other end of the main spring 19.

Prior to assembling the connector, preferably a two part fiber clamp 17, preferably of plastic material, is clamped in part onto the buffered fiber 33 and partly on the bare fiber core 35 of the cable 27. The buffer 37 extends for a predetermined distance into the clamp 17 and is then terminated. The clamp 17 is a two part clamp having members 17a and 17b, each having V-shaped groove portions 17c and 17d different sizes. Further, at the end proximate the spring 19 the clamp 17 includes a larger diameter portion 17e.

Figure 4:
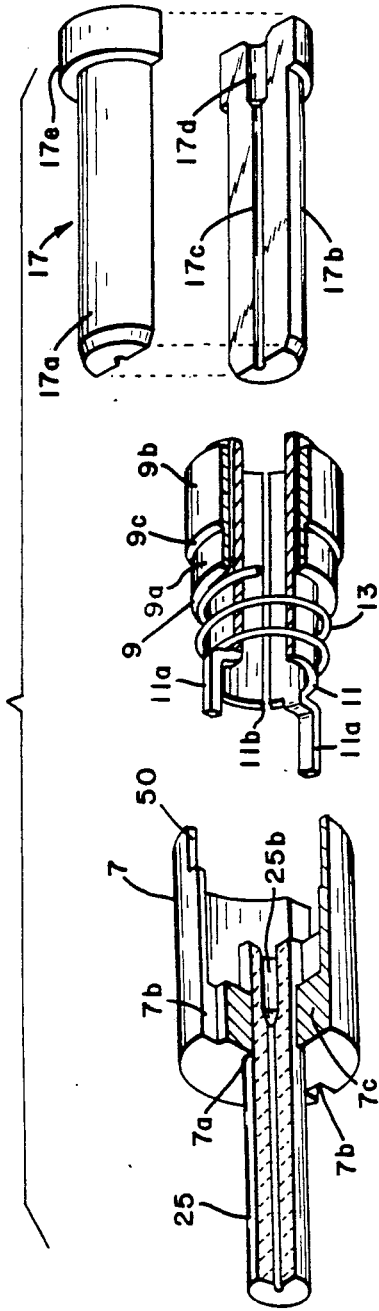
FIG. 4 is an exploded view in partial cross-section of the capillary ferrule, capillary retainer, clamp, clamp body, compensating mechanism and key mechanism of the preferred embodiment of the connector according to the invention.

To provide the necessary clamping, the corresponding V-shaped portions 17d are dimensioned to be, when the clamp 17 is assembled, slightly smaller than the diameter of the buffered fiber 33 for holding the buffer at said V-shaped portions 17d. The larger V-shaped portions 17d then taper into smaller size V-shaped portions 17c which serve to hold the bare fiber 35 between the two clamping members 17a and 17b. In this case, the space provided by V-shaped portions 17c when clamp 17 is assembled is slightly smaller than the diameter of bare fiber 35 so that the bare fiber 35 is held firmly thereby. The members 17a and 17b are then held together by clamp body 11 which is made up typically of a metal sleeve split having a cut-out portion 11b as more clearly shown in FIG. 4, in partial cross-section, which includes keying tabs 11a whose function will be described hereinafter. In a preferred embodiment, the larger diameter portion 17e serves the purpose of preventing the members 17a and 17b from being inserted further than a predetermined distance into the clamp body 11. This larger diameter portion 17e is not necessary and can be replaced by other equivalent features or structures.

Over the clamp body 11 is slidably received a compensator body sleeve 9 having a smaller diameter portion 9a and a larger diameter portion 9b. In addition, a clamp body spring 13 is received around the clamp body 11 in abutment between the end of smaller diameter portion 9a and keying tabs 11a. The compensator body sleeve 9 is held on the clamp body 11 by turned out tabs 11b of clamp body 11, as is more clearly shown in FIG. 3.

A capillary retainer 7 is slidably received over clamp body 11 and in abutment with the end of smaller diameter portion 9a of compensator body 9. Slots 7b are provided in the capillary retainer 7 as clearly shown in FIG. 4 for engaging tabs 11a to maintain the clamp body 11 in non-rotational relationship with respect to the capillary retainer 7 but in slidable relationship along the longitudinal axis with respect to each other. In this regard, the capillary retainer 7 includes a wall 7c having a thickness less than the length of tabs 11a as will be explained hereinafter. The wall 7c includes a passage 7a in the center thereof, typically press-fit engaging a capillary ferrule 25 therein. The ferrule 25 is typically a conventionally manufactured ceramic ferrule. The ferrule includes a larger passage portion 25b to permit initial ease of passage of the bare fiber 35 thereinto and tapers into a smaller passage portion 25a which permits sliding of the bare fiber 35 with respect to the ferrule 25, but prevents excessive transverse movement to thereby ensure centered optical alignment when connected to a like ferrule having a like bare fiber therein.

Prior to assembly of the connector, the rear body 3, spring 19 and spacer 15 are held over the cable 27 with the clamp 17, clamp body 11, compensator body 9 clamp body spring 13, capillary retainer 7 and capillary ferrule 25 assembly spaced therefrom. The buffer 33 and bare fiber 35 are held as described with the bare fiber 35 extending outwardly from the capillary ferrule 25. As previously discussed, the tabs 11a are longer than the thickness of wall 7c and extend therefrom in the direction of the free end of capillary ferrule 25. In order to terminate the bare fiber 35 in a manner such that the bare fiber 35 will always be flush with the end of capillary ferrule 25, the clamp body 6 is compressed against clamp body spring 13 an amount sufficient that the ends of tabs 11a are flush with the face of wall 7c. The bare fiber 35 is then cleaved flush with the end face of capillary ferrule 25. The cleaving sequence is clearly shown in FIGS. 5a and 5b. The method of cleaving the fiber flush with the mating face is known to those of ordinary skill in the art and can be conducted in accordance with the method described in U.S. application Ser. No. 474,099 filed Mar. 10, 1983 (now U.S. Pat. No. 4,643,520) of one of the herein named inventors, and which disclosure is specifically incorporated by reference herein. Accordingly, the thus cleaved bare fiber 35 will require no polishing or buffing as is required in the prior art connectors.

Once cleaved, the clamp body spring 13 is allowed to relax and as a result, the end of the bare fiber 35 will extend partially beyond the free end of capillary ferrule 25 as shown in FIG. 5B. At this stage, the connector is ready to be assembled. This relative positioning and change in positioning is more clearly shown in FIGS. 5a and 5b as was discussed above.

To assemble the connector, the rear body 3 and associated elements are brought over the clamping ferrule assembly. The crimping extension 37 and optionally the inner sleeve 21 are crimped to secure the cable 27 to the rear body 3. A front body 1 having inner threads 1a is then threaded onto corresponding threads 3a of the rear body 3 with the previously discussed assembly held therein. In this regard, the rear body 3 also includes a key tab 3b which engages with a corresponding slot 50 in the capillary retainer 7 to prevent rotation of the capillary retainer 7 relative to rear body 3. This is more clearly shown in FIGS. 1A, 2 and 4. In this regard, the slot 50 must be sufficiently long to permit movement of the capillary retainer 7 rearwardly so that the connector and ferrule 25 can be connected to a like connector and ferrule 25 through the adaptor 40 as will be discussed hereinafter.

The front body 1 also includes a coupling nut 5 rotatably engaged with respect thereto to be threadably engaged through threads 5a to the adaptor 40 to be discussed hereinafter. The coupling nut 5 is expanded during assembly for connection to the front body 1 as shown. Further, the front body 1 also includes a key tab 6 which is integral therewith as a bent-out portion, and which ensures precise connection relative to a fixed rotational position with respect to the adaptor 40 by engaging the cut-out portion 55 of the adaptor 40 as seen in FIGS. 1B and 3.

Inside the rear body 3, the spacer 15 is received over the large diameter portion 17e of clamp 17 and the end tabs 11b of clamp body 11, and abuts against the large diameter end of compensator body 9. In assembled condition the tabs 11a abut against wall 1b of front body 1 forcing the clamp body 11 back against clamp body spring 13 so that the end of tabs 11a are flush with the end face of wall 7c and both abut against wall 1b.

.In this case the bare fiber 35 is forced into the position relative to capillary ferrule 25 at which it was in during the cleaving operation as is shown in FIG. 5a. The end of bare fiber 25 will thus be flush with the free end of the capillary ferrule 25. In this regard, it is possible to not cleave the bare fiber 25 until the entire connector is assembled since when the connector is assembled, the ends of tabs 11a and the face of wall 7c will be flush as in the case of the previously discussed cleaving operation. Cleaving can then be performed.

Figure 3:
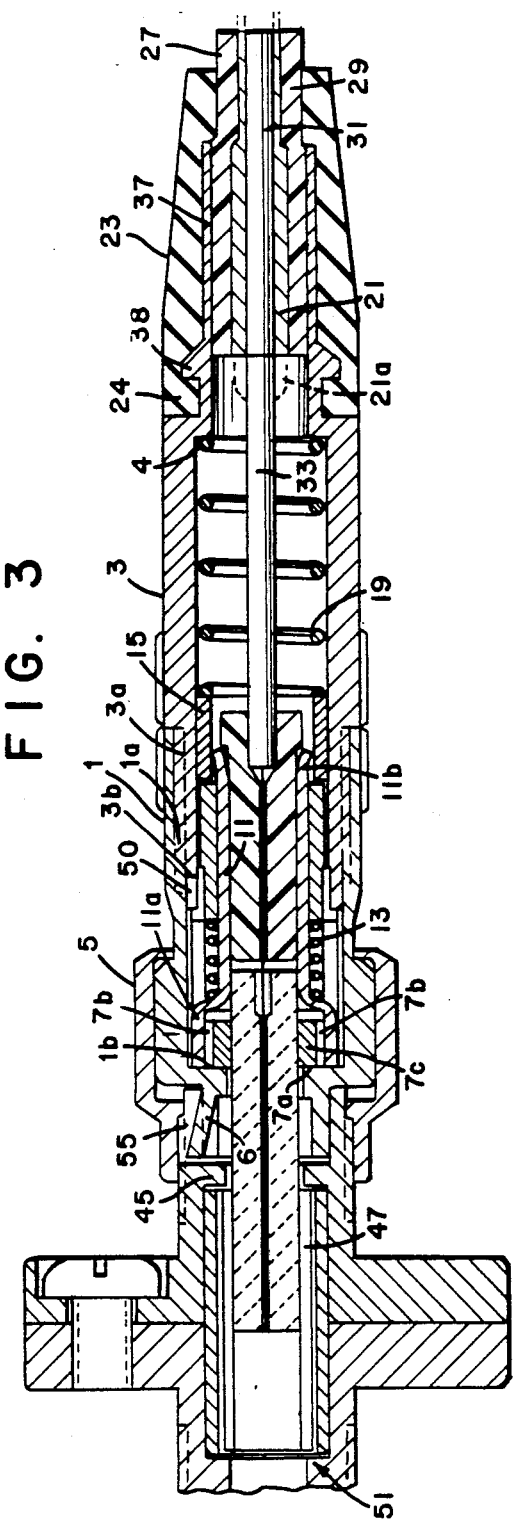
FIG. 3 is a side cross-sectional view of the connector assembly of FIGS. 1A and 2.

When it is desired to connect the connector of the invention to a like connector, the adaptor body 40 is provided which is made up of two like pieces 41 held together at screw holes 49 by respective screws, as shown in FIG. 3, passed therethrough. When assembled, the pieces 41 define a passageway 51 therethrough with a centering sleeve 53 serving to align the pieces 41 when being assembled. Once assembled, ridges 45 serve to prevent the centering sleeve 53 from sliding out of the adaptor.

A ferrule centering sleeve 47 is also received inside the sleeve 53 and serves to frictionally receive ferrule 25 for centering and aligning it with a like ferrule 25 of another connector. Thus, to assemble two connectors together, the adaptor 40 is threaded to the coupling nut 5 at threads 43 and the capillary ferrule 25 received in sleeve 47. A like connection is effected on the other side of the adaptor 40. Further, in order to ensure repeatability of results, the adaptor 40 includes, as previously discussed, slots 55 which engage with key tabs 6 of front body 1 to ensure repeatable relative rotational positioning of one connector body with respect to another.

Inside the rear body 3, the capillary retainer 7 is dimensioned to provide a predetermined clearance with the inner wall of the front body 1 thereby providing a free-floating structure in a direction transverse to the longitudinal axis of the connector. The clearance between the other elements and the inner wall of front body 1 or rear body 3 must then be such as to not impede said free-floating structure. Thus, for example, the clearance between compensator body 9 and the inner walls of rear body 3 must be at least as great as that between the inner wall of front body 1 and capillary retainer 7. A like clearance is also provided between sleeve 47 and sleeve 53 in the adaptor 40.

With respect to the sleeve 47, this sleeve can be a triangular split sleeve as shown in FIG. 6, or a cylindrical sleeve as in FIG. 7. The sleeve will preferably be of smaller cross-section than the ferrule 25 and due to spring tension will compressively hold the ferrule 25. The only requirement is that it be constructed such that if the ferrule 25 is inserted not in alignment with the longitudinal axis thereof, it be sufficiently resistant to bending to force the ferrule 25 back into alignment in cooperation with the above-discussed free-floating structure. Thus, due to the spring loaded compensating mechanism, as can be appreciated from the drawing, when being connected to a like connector, the capillary ferrule 25 will be forced inward compressing, through the described mechanism, the spring 19. Spring 13 will tend to force the clamp body 11 against wall 1b. However, since the end of bare fiber 35 will abut physically against a like end, it will not be permitted to extend beyond the end of capillary ferrule 25. Moreover, in the case when precise longitudinal alignment is not achieved, the compensating mechanism will urge the respective fiber 35 out from their respective ferrules 25 so that they will physically contact each other at the respective ends thereof even if the ferrules 25 only contact each other at a partial angle and not flush with each other. Accordingly, in these cases the spring 13 will also compress and the ends of tabs 11a will not abut wall 1b. In this regard, the spring 13 is capable of exerting a force of only about 50-100 gms, preferably about 60 gms, to prevent damage to the faces of bare fibers 35. The spring 19 on the other hand is capable of exerting about 2 lbs of force to ensure tight connection between the ends of the capillary ferrules 25 by cooperation with the centering sleeve.

In an alternative construction as shown in FIGS. 8 and 9, the key mechanism can be a sleeve 8 which fits over the capillary retainer and clamp arrangement previously described. The sleeve 8 would include tabs 11a'' which engage slot 50 of the capillary retainer 7, which is this case would extend out from the body of retainer 7 or be of other equivalent construction as will be apparent to those of ordinary chill in this art. To prevent rotation, the sleeve 8 would be forced against the front wall 2b of, in this case a one-piece body 2, by a modified cable clamping mechanism. More particularly, while not showing the inner sleeve 21, it would be inserted in the cable 27 as discussed previously. A sleeve 37 would be received over the cable 27 and crimped thereon with turned out portion 37a abutting against sleeve 8 in body 2. An outer holder 10 would then be threaded by engagement between threads 2a and 10a by turning at portion 10b to secure the cable 27 to the body 2. In this case, the sleeve 8 would house the spring 19 within it. The sleeve 8 would then abut at 11a'' at walls 2b.

In a still further modification for use with multimode fiber optic cables, the compensating mechanism can be omitted since gap creation becomes less important. In this case a fiber holding mechanism as in FIG. 9 can be employed. The capillary retainer 7'' holds the capillary ferrule 25. A clamp 17'' is engaged at threads 17a'' to the capillary retainer 7''. The buffered fiber 33 is held by deformable material 17b'' such as lead by crimping of clamp 17''. The key mechanism and cable securing mechanism will be as discussed with reference to FIG. 8 and more clearly shown in FIG. 9.

The materials employed in practicing the invention are well known and conventional as will be readily apparent to those of ordinary skill in the art. Thus, they will not be discussed in further detail herein. Except as otherwise noted, all parts are preferably of metal construction. More particularly, the fiber clamp of the preferred embodiment will be plastic with the capillary ferrule preferably of ceramic.

While particular embodiments of the present invention have been shown and described, it will be obvious to those skilled in the art that various changes and modifications may be made without departing from the scope of the invention and its aspects. Accordingly, the aim of the appended claims is to cover all such changes and modifications as may fall within the true spirit and scope of the invention.

What is claimed is:

1. A fiber optic cable connector, comprising:
   a body having two ends;
   cable connection means for connecting a fiber optic cable of the type having a fiber extending through the center thereof with the fiber concentrically surrounded by a buffer layer to said body at one end thereof in a manner such that a portion of the cable having the fiber surrounded by the buffer layer and a portion of the cable having the fiber stripped of its buffer layer extends into said body;
   fiber retention means for holding the buffer layer covered fiber at a terminated portion of the buffer layer wherefrom the fiber extends, and for holding the bare fiber extending from the terminated buffer layer in fixed relationship with respect to said fiber retention means, and within said body
   capillary ferrule means for receiving said portion of said bare fiber therein in a manner such that said fiber is slidable within said capillary ferrule means and further including capillary retaining means for holding said capillary ferrule means in fixed relationship with respect thereto and in a manner extending frm the oher end of said body, and such that said capillary retaining means is retained within said body;
   spring means for urging said capillary retaining means toward said other end of said body and for permitting said capillary ferrule means to retract into said body upon a force being applied thereto when said connector is connected to a like connector; and
   compensating means for permitting termination of said fiber in a manner such that it is urged outwardly from the end of said capillary ferrule means when said connector is assembled, and when said connector is connected to a like connector for maintaining the end of the fiber flush with the end of said capillary ferrule means, whereby physical contact between the ends of two bare fibers is obtained by connecting said connector to another like connector and maintained under varying temperature and alignment conditions.

2. A connector as in claim 1 wherein said body has internal walls defining a cavity therein, and said capillary retaining means is spaced from the internal walls of said body by a predetermined distance to provide a free-floating structure in a direction transverse to the longitudinal axis of said body.

3. A connector as in claim 2 further comprising, in combination, adaptor means for being connected to respective ends of like connectors, said adaptor means further comprising centering sleeve means for aligning respective capillary ferrule means of respective connectors for connection together.

4. A connector as in claim 3 wherein said centering sleeve means is spaced from inner walls of said adaptor means by an amount equal to the spacing between the internal walls of said body and said capillary retaining means to maintain said free floating structure.

5. A connector as in claim 4 wherein said adaptor means further comprises non-rotating key means for ensuring connection of respective connectors in predetermined positions with respect thereto.

6. A connector as in claim 3 wherein said adaptor means further comprises non-rotating key means for ensuring connection of respective connectors in predetermined positions with respect thereto.

7. A connector as in claim 1 wherein said cable connection means comprises crimp means at one end of said body for being crimped onto the outside of said cable, said cable having arranged concentrically in sequence from the buffer layer to the exterior, a strength layer and a cover, and inner sleeve means for being received inside said cable around the buffer layer and bare fiber thereof with the strength layer and cover thereof crimped between said inner sleeve means and said crimp means.

8. A connector as in claim 7 wherein said inner sleeve means is crimpable for holding said cable at the buffer layer thereof.

9. A connector as in claim 1 wherein said compensating means comprises a spring positioned in manner such as to exert a predetermined force along the longitudinal axis of said bare fiber for urging said bare fiber within said capillary ferrule means in a direction toward connection with a like connector sufficient to cause said bare fiber to physically abut against a like bare fiber of another connector but insufficient to cause damage to the end of said bare fiber.

10. A connector as in claim 9 wherein said compensating means spring is constructed for exerting substantially less force on said bare fiber than said spring exerts on said capillary ferrule means.

11. A connector as in claim 1 further comprising non-rotating key means for preventing rotation of said bare fiber about its longitudinal axis relative to said body.

12. A connector as in claim 11 further comprising in combination adaptor means for being connected to respective ends of like connectors, said adaptor means further comprising centering sleeve means for aligning respective capillary ferrule means of respective connectors for connection together.

13. A connector as in claim 12 wherein said non-rotating key means is a bent out tab integral with said body.

14. A connector as in claim 1 further comprising in combination, adaptor means for connecting respective ends of like connectors together, said adaptor means further comprising centering sleeve means for aligning respective capillary ferrule means of respective connectors for connection together.

15. A connector as in claim 14 wherein said centering sleeve means is a metal split sleeve of circular cross-section and substantially rigid to resist any forces transverse to the connector longitudinal axis exerted by said spring.

16. A connector as in claim 14 wherein said centering sleeve means is a metal split sleeve of triangular cross-section and substantially rigid to resist any forces transverse to the connector longitudinal axis exerted by said spring.

17. A connector as in claim 14 wherein said adaptor means further comprises non-rotating key means for ensuring connection of respective connectors in predetermined positions with respect thereto.

* * * * *